US010254865B2

(12) United States Patent
Beraud

(10) Patent No.: US 10,254,865 B2
(45) Date of Patent: Apr. 9, 2019

(54) DISPLAY DEVICE INTENDED NOTABLY FOR A MOTOR VEHICLE

(71) Applicant: Valeo Systemes Thermiques, Le Mesnil Saint Denis (FR)

(72) Inventor: Henry Beraud, Vincennes (FR)

( * ) Notice: Subject to any disclaimer, the term of this patent is extended or adjusted under 35 U.S.C. 154(b) by 165 days.

(21) Appl. No.: 15/104,269

(22) PCT Filed: Dec. 18, 2014

(86) PCT No.: PCT/FR2014/000294
§ 371 (c)(1),
(2) Date: Jun. 14, 2016

(87) PCT Pub. No.: WO2015/092170
PCT Pub. Date: Jun. 25, 2015

(65) Prior Publication Data
US 2017/0003787 A1    Jan. 5, 2017

(30) Foreign Application Priority Data
Dec. 20, 2013 (FR) ...................................... 13 03043

(51) Int. Cl.
*G06F 3/041* (2006.01)
*B60K 35/00* (2006.01)
(Continued)

(52) U.S. Cl.
CPC ............ *G06F 3/0412* (2013.01); *B60K 35/00* (2013.01); *G06F 3/044* (2013.01); *G06F 3/045* (2013.01);
(Continued)

(58) Field of Classification Search
CPC ........ G06F 3/041; G06F 3/0412; G06F 3/044; G06F 3/045; B60K 2350/1028; B60K 2350/20
(Continued)

(56) References Cited

U.S. PATENT DOCUMENTS 8,634,039 B2 * 1/2014 Lai ....................... H05K 9/0054
345/173
2013/0038542 A1 * 2/2013 Kim ....................... G06F 3/041
345/173
(Continued)

FOREIGN PATENT DOCUMENTS

KR    2009 0064147 A    6/2009
WO    2012/131192 A1    10/2012

OTHER PUBLICATIONS

International Search Report issued in PCT/FR2014/000294 dated Mar. 26, 2015 (2 pages).
(Continued)

Primary Examiner — Jason M Mandeville
(74) Attorney, Agent, or Firm — Osha Liang LLP

(57) ABSTRACT

Display device intended notably for a motor vehicle and comprising:—a display screen (2),—a touch-sensitive pad (5) positioned in front of the display screen,—a lateral surround (3) positioned over part of the front surface of the display screen, —a first opaque mask (4) positioned between the touch-sensitive pad and the lateral surround (3) and extending toward the center of the front surface of the display screen beyond the lateral surround so as to conceal said lateral surround,—a second opaque mask (6) positioned in front of the touch-sensitive pad and concealing a lateral part of the front surface of the touch-sensitive pad which part is positioned in front of the first mask, in which device the first mask extends toward the center of the front surface of the screen beyond the second mask.

19 Claims, 1 Drawing Sheet

(51) Int. Cl.
*G06F 3/044* (2006.01)
*G06F 3/045* (2006.01)
*B60K 37/02* (2006.01)
*G01C 21/36* (2006.01)

(52) U.S. Cl.
CPC ...... *B60K 37/02* (2013.01); *B60K 2350/1028* (2013.01); *B60K 2350/20* (2013.01); *G01C 21/3667* (2013.01)

(58) Field of Classification Search
USPC .................................................. 345/173–174
See application file for complete search history.

(56) References Cited

U.S. PATENT DOCUMENTS

2013/0330515 A1* 12/2013 Oh .......................... C03C 15/00
428/156
2014/0029207 A1* 1/2014 Beraud .................. B60K 37/06
361/728

OTHER PUBLICATIONS

Written Opinion of the International Searching Authority issued in PCT/FR2014/000294 dated Mar. 26, 2015 (6 pages).

* cited by examiner

DISPLAY DEVICE INTENDED NOTABLY FOR A MOTOR VEHICLE

The present invention relates to a display device intended especially for an automotive vehicle such as an automobile or a truck. In particular, the invention relates to a display device for a navigation system or an on-board computer of an automotive vehicle. The invention also relates to a dashboard of an automotive vehicle comprising a display device according to the invention.

Increasingly, automotive vehicles are equipped with human-machine interfaces comprising a display device with a touch panel. This type of device allows functions in the automotive vehicle to be controlled and information useful to the user to be displayed.

This type of display device comprises at least one display screen and a touch panel. The display screen is generally fastened to a casing.

The display screen typically comprises a display area addressed by means of electronic elements. The electronic elements are placed on the lateral portion of the display screen and generally are hidden by means of a metal frame that holds the assembly together. These electronic elements, also referred to as "technical portions", may comprise electrical tracks, soldered cables and/or electronic circuits.

In conventional configurations, a portion of the metal frame extends over the front surface of the display screen. It is not desirable, in particular for aesthetic reasons, for the metal frame to be visible to the user of the display device.

Certain display devices comprise a casing the lateral edges of which comprise an additional trim frame covering the lateral edges of the display and thus masking the metal frame or another technical element of the display screen.

Other prior art display devices comprise a single, generally black, opaque mask hiding the metal frame.

However, this type of additional trim frame or single mask extends a substantial distance in the direction of the center of the front surface of the display screen and also masks a portion of the image from the users. In particular, this is the case for users who are positioned obliquely relative to the front face of the display device. In an automotive vehicle context, an oblique position is the most frequent position of a user.

The aim of the invention is to provide a display device allowing technical elements and/or the metal frame of a display screen to be masked while allowing the user to see all of the display area of the display screen.

For this purpose, the invention relates to a display device especially intended for an automotive vehicle, comprising:
  a display screen,
  a touch panel placed in front of the display screen,
  a lateral frame placed on a portion of the front surface of the display screen,
  a first opaque mask placed between the touch panel and the lateral frame and extending in the direction of the center of the front surface of the display screen beyond the lateral frame so as to mask said lateral frame,
  a second opaque mask placed in front of the touch panel and masking a lateral portion of the front surface of the touch panel placed in front of the first mask,
  wherein the first mask extends in the direction of the center of the front surface of the screen beyond the second mask.

Advantageously, the use of two masks shifted one relative to the other allows the lateral frame to be masked while making it possible for the user to see all of the display area of the display screen. To obtain an equivalent masking with a single mask, said mask would have to be placed in front of the touch panel i.e.: further from the lateral frame than the first mask according to the invention, and would therefore extend further in the direction of the center of the front surface of the screen than the first mask according to the invention. A single mask would therefore mask a portion of the image of the screen.

The device according to the invention may also comprise one or more of the features below, considered individually or in any technically possible combination:
  the front surface of the display screen, the front surface of the touch panel and the first and second masks are substantially plane and parallel to one another; and/or
  in at least one section of the display device, the straight line connecting the point of the first mask closest the center of the front surface of the display screen and the point of the second mask closest the center of the front surface of the display screen makes with the normal to the front surface of the screen at the point of the first mask closest the center of the front surface of the display screen an angle larger than or equal to 10° and lower than or equal to 55°; and/or
  in at least one section of the display device, the straight line connecting the point of the first mask closest the center of the front surface of the display screen and the point of the lateral frame closest the center of the front surface of the display screen makes with the normal to the front surface of the screen at the point of the first mask closest the center of the front surface of the display screen an angle larger than or equal to 10° and lower than or equal to 55°;
  the display device furthermore comprises a casing to which the display screen is fastened; and/or
  the second mask is placed so as to mask at least one portion of the casing; and/or
  the touch panel is of capacitive or resistive type; and/or
  the display device furthermore comprises a transparent sheet placed on the second mask and the front face of the touch panel; and/or
  the opaque masks are deposited by screen printing on glass; and/or
  the second opaque mask is deposited by screen printing on the transparent sheet; and/or
  the first mask is deposited by screen printing on the back face of the touch panel.

The invention also relates to a display device especially intended for an automotive vehicle, comprising:
  a display screen,
  a touch panel placed in front of the display screen,
  a lateral frame placed on a portion of the front surface of the display screen,
  a first opaque mask placed between the touch panel and the lateral frame and extending in the direction of the center of the front surface of the display screen beyond the lateral frame so as to mask said lateral frame, the first opaque mask being deposited by screen printing on the back face of the touch panel.

The device according to the invention may also comprise one or more of the features below, considered individually or in any technically possible combination:
  the device furthermore comprises a second opaque mask placed in front of the touch panel and masking a lateral portion of the front surface of the touch panel placed in front of the first mask, the first and second masks extend substantially in the same way in the direction of the center of the front surface of the screen beyond the lateral frame; and/or the first mask extends in the direction of the center of the front surface of the screen beyond the second mask; and/or the front surface of the display screen, the front surface of the touch panel and the first and second masks are substantially plane and parallel to one another; and/or in at least one section of the display device, the straight line connecting the point of the first mask closest the center of the front surface of the display screen and the point of the second mask closest the center of the front surface of the display screen makes with the normal to the front surface of the screen at the point of the first mask closest the center of the front surface of the display screen an angle larger than or equal to 10° and lower than or equal to 55°; and/or in at least one section of the display device, the straight line connecting the point of the first mask closest the center of the front surface of the display screen and the point of the lateral frame closest the center of the front surface of the display screen makes with the normal to the front surface of the screen at the point of the first mask closest the center of the front surface of the display screen an angle larger than or equal to 10° and lower than or equal to 55°;

the display device furthermore comprises a casing to which the display screen is fastened; and/or the second mask is placed so as to mask at least one portion of the casing; and/or the touch panel is of capacitive or resistive type.

The invention also relates to a dashboard of an automotive vehicle comprising a display device according to the invention.

The invention will be better understood on reading the following description, given by way of nonlimiting example, of the implementation thereof, and on examining the appended drawings in which.

In the context of the invention, by "front surface" of an element of the display device what is meant is that surface of said element which is closest to the final user of the display device in use.

In the context of the invention, a first element is located "in front" of a second element when the first element is closer the final user of the display device than the second element in use.

In the context of the invention, by a "lateral portion of a surface" what is meant is the portion located on the sides of this surface, in other words the portion closest the perimeter of this surface, as opposed to the central portion of the surface located on the side of the center of the surface.

In the context of the invention, by "center of a surface" what is meant is the center of the circle inscribed within or the center of the circle circumscribed around the perimeter of said surface.

Figure 2:
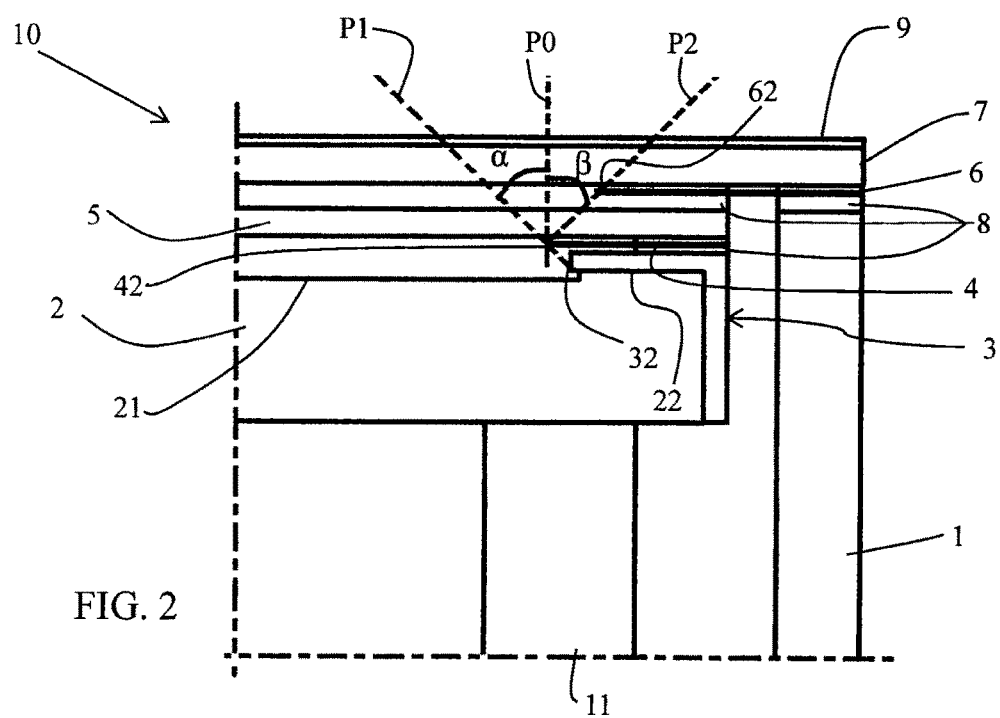
FIG. 2 illustrates a cross-sectional view along the axis II-II of the display device in FIG. 2.

With reference to FIG. 2, the display device 10 according to the invention comprises a casing 1 and a display screen 2.

The casing 1 is preferably substantially parallelepipedal shape, and has lateral walls, a back wall and a front wall. The front wall of the casing 1 may take the form of a transparent or semitransparent sheet 7, for example a smoked sheet placed so that the display of the display screen 2 is visible to the user through this transparent sheet 7.

The transparent sheet 7 is often fixed to the lateral walls of the casing 1 for example by means of an adhesive 8. In particular, the transparent sheet 7 may be made of glass, plastic or any other equivalent material known to those skilled in the art. It may serve to protect the elements of the display device 10, for example in order to prevent dust from getting into the casing. The sheet 7 also has a function in stiffening or decorating the display device according to the invention. The sheet 7 is the visible and touchable element of the display device.

In the interior of the casing is fastened a display screen 2. The display screen 2 may be a TFT, LCM, LCD or OLED screen.

The front surface of the display screen 2 comprises a display area 21 and a lateral portion 22.

Preferably, the display screen 2 is fastened to the casing 1 via its back face. The display screen may also be suspended under the sheet 7, if the latter is stiff, by adhesive bonding, or be pressed against the sheet under the effect of an elastic element such as a spring or a foam.

A lateral frame 3 extends over a portion of the lateral portion 22 of the front surface of the display screen 2.

The lateral frame 3 may also be placed on one of the lateral surfaces of the display screen. The lateral frame 3 covers a set of technical elements ensuring the operation, for example the addressing, of the display screen. This lateral frame 3 or trim, generally called a bezel, is placed on the periphery of the screen and protects the edge faces thereof.

Typically, the lateral frame 3 is made of metal in order, while remaining thin, to allow a good mechanical protection of the display screen and to protect the electronic circuits and tracks placed on the edge of the screen from electrostatic discharges. In order to prevent scratching of the glass, a seal is generally placed between the lateral frame and the surface of the screen.

The display device 10 furthermore comprises a touch panel 5 placed in front of the display screen. The touch panel 5 is placed between the display screen 2 and the transparent sheet 7. The touch panel 5 preferably extends over the entirety of the display area 21 of the display screen. Preferably, the touch panel is fixedly placed relative to the display screen. The touch panel 5 may be of resistive or capacitive type.

The transparent sheet 7 extends over the touch panel 5.

As shown in FIG. 2, the display device 10 according to the invention comprises a first opaque mask 4 placed between the touch panel 5 and the display screen 2. The first mask 4 is placed so as to mask a portion of the lateral portion of the front surface of the display screen.

Preferably, the first mask is placed so as to mask at least that portion of the lateral portion of the front surface of the display screen on which the lateral frame 3 is placed.

By "mask a portion of a surface" what is meant is the fact of covering said portion with an opaque mask making said portion invisible to the final user of the display device in use.

The display device 10 also comprises a second mask 6 placed in front of the touch panel and masking the lateral portion in front of the front surface of the touch panel and placed in front of the first mask 4.

The first mask 4 extends in the direction of the center of the front surface of the screen beyond the second mask 6. Advantageously, such a configuration allows a portion of the lateral area of the display screen to be masked while ensuring the user has a maximum visibility of the display portion of the front face of the display screen, above all when viewed obliquely.

In practice, the first and second masks of the device according to the invention are thin opaque layers.

According to one preferred embodiment of the invention, the front surface of the display screen, the front surface of the touch panel and the first and second masks are substantially plane and parallel to one another. Likewise, the transparent sheet is preferably plane and substantially parallel to the front surface of the display screen.

As shown in FIG. 2, in the at least one section of the display device 10, the first mask 4 extends in the direction of the center of the front surface of the display screen beyond the frame 3, as far as to a first point 42.

Figure 1:
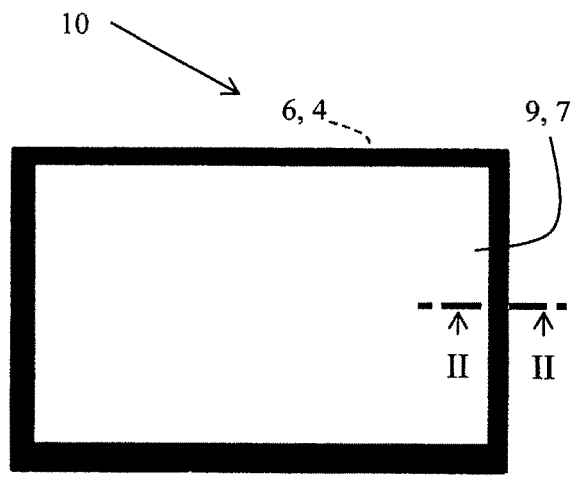
FIG. 1 illustrates a front view of a device according to the invention.

In particular, as may be seen in FIG. 1, in at least one section of the display device, it is possible to define a straight line P2 between the point 42 of the first mask closest the center of the front surface of the display screen and the point 62 of the second mask closest the center of the front surface of the display screen.

The straight line P2 represents an incident ocular trajectory of a user positioned obliquely relative to the display device 10.

It is also possible to define a straight line P1 between the point 42 of the first mask closest the center of the front surface of the display screen and the point 32 of the lateral frame closest the center of the front surface of the display screen.

Just as above, the straight line P1 represents an incident ocular trajectory of a user positioned obliquely relative to the display device. The straight line P2 represents an incident ocular trajectory of a user positioned obliquely relative to the display device.

According to one embodiment of the invention, the display device is configured so that the angle β between the straight line P2 and the normal P0 to the front surface of the screen at the point 42 of the first mask closest the center of the front surface of the display screen is larger than or equal to 0°, for example larger than or equal to 10°, for example larger than or equal to 15°, and lower than or equal to 55°, for example lower than or equal to 45°.

Likewise, according to another embodiment of the invention, the display device is configured so that the angle α between the straight line P1 and the normal P0 to the front surface of the screen at the point 42 of the first mask closest the center of the front surface of the display screen is larger than or equal to 10°, for example larger than or equal to 15°, and lower than or equal to 55°, for example lower than or equal to 45°.

Advantageously, such values of α and β prevent a user positioned obliquely from perceiving the generally shiny edges of the lateral frame 3.

Likewise, an oblique user perceives a maximum of the edges of the display area 21.

The point 32 will advantageously be positioned to also absorb tolerance deviations in the position of the first mask 4, i.e. the first mask will extend in the direction of the center of the front surface of the display screen a little more than necessary, taking advantage of the fact that the image is generally (1 to 2 mm) a very little bit smaller than the edge 32 of the lateral frame 3.

It will be clear that to obtain the same angle a with a single mask placed as the second mask in front of the touch panel, said mask would have to extend in the direction of the center of the screen more than the first mask 4, thus masking a portion of the display area 21.

Thus, the first mask 4 allows optimal masking of the frame, and the second mask 6 at the most permits vision of the edges of the display area 21. In particular, the mask 4 is placed as close as possible to the lateral frame 3 to decrease the field of view as little as possible.

As illustrated in FIG. 2, the touch panel may be adhesively bonded to the lateral frame by means of one or more adhesive layers 8. The same goes for the transparent sheet 7 fastened to the casing.

The transparent sheet 7 may also be covered with a polarizer 9 limiting parasitic reflections from the transparent sheet 7.

The display screen 2 is fastened to the casing here by way of a connecting element 11, preferably screwed to the casing (not shown).

The first and/or second mask are opaque and may be gray or black in color or colors that match or contrast with the decor, or be graded, in order to form a border framing the image.

The manufacture of the device according to the invention includes a step in which the first and second masks are positioned so that they are placed as described above. According to one embodiment, the masks may be produced by screen printing on glass.

This screen printing method allows a mask taking the form of a thin layer to be produced, precisely, reproducibly and at low cost, on the transparent sheet 7 and/or the touch panel 5.

Of course, the invention is not limited to the described embodiments and extends to other variants while remaining within the scope of the claims.

In the present, the word "comprising" does not exclude other elements and the indefinite article "a" or "one" does not exclude a plurality. The simple fact that the various features are cited together in various dependent claims does not indicate that the combination of these features cannot be used advantageously.

Any reference signs in the claims must not be interpreted as limiting the scope of the invention.

The invention claimed is:

1. A display device especially intended for an automotive vehicle, comprising:
    a display screen having a front surface comprising a display area and a lateral portion;
    a touch panel placed in front of the display screen;
    a lateral frame placed between the display screen and the touch panel to cover an entire peripheral edge of the display screen, the lateral frame having an L shape with a lateral portion and a side portion, the side portion extending along sides of the display screen and the lateral portion extending over the entire lateral portion of the display screen and over a portion of the display area of the display screen;
    a first opaque mask placed in front of the lateral frame between the touch panel and the lateral frame, the first opaque mask covering the entire lateral portion of the lateral frame and extending beyond the lateral portion of the lateral frame and over the display area of the display screen so as to mask said lateral frame; and
    a second opaque mask placed in front of the touch panel, the second opaque mask extending at least from an edge of the touch panel and masking a lateral portion of a front surface of the touch panel, the second opaque mask placed in front of the first opaque mask,
    wherein the second opaque mask extends over a portion of the lateral surface of the lateral frame, and the first opaque mask extends in a direction of a center of the front surface of the display screen beyond the second opaque mask such that a predetermined angle between 0° and 55° is formed between a straight line connecting a point of the first opaque mask closest to a center of the front surface of the display screen and a point of the second opaque mask closest to the center of the front surface of the display screen, and a line normal to the front surface of the display screen at the point of the first opaque mask closest to the center of the front surface of the display screen.

2. The display device as claimed in claim 1, wherein the front surface of the display screen, the front surface of the touch panel and the first and second opaque masks are substantially plane and parallel to one another.

3. The display device as claimed in claim 1, wherein the straight line connecting the point of the first opaque mask closest to the center of the front surface of the display screen and the point of the second opaque mask closest to the center of the front surface of the display screen makes with the line normal to the front surface of the display screen at the point of the first opaque mask closest the center of the front surface of the display screen an angle larger than or equal to 15° and lower than or equal to 55°.

4. The display device as claimed in claim 1, wherein a straight line connecting the point of the first opaque mask closest to the center of the front surface of the display screen and a point of the lateral portion of the lateral frame closest to the center of the front surface of the display screen makes with the line normal to the front surface of the display screen at the point of the first opaque mask closest the center of the front surface of the display screen an angle larger than or equal to 10° and lower than or equal to 55°.

5. The display device as claimed in claim 1, furthermore comprising a casing to which the display screen is fastened.

6. The display device as claimed in claim 5, wherein the second opaque mask is placed so as to mask at least one portion of the casing.

7. The display device as claimed in claim 1, wherein the touch panel is of capacitive or resistive type.

8. The display device as claimed in claim 1, furthermore comprising a transparent sheet placed on the second opaque mask and the front surface of the touch panel.

9. The display device as claimed in claim 8, wherein the first and second opaque masks are deposited by screen printing on glass.

10. The display device as claimed in claim 9, wherein the second opaque mask is deposited by screen printing on the transparent sheet.

11. The display device as claimed in claim 9, wherein the first opaque mask is deposited by screen printing on a back surface of the touch panel.

12. A dashboard of an automotive vehicle comprising a display device as claimed in claim 1.

13. The display device as claimed in claim 1, further comprising a transparent sheet that:
is placed on the second opaque mask and the front face of the touch panel,
is an outermost layer of the display device,
is the only touchable element of the display device, and
extends over an entirety of the front of the display device.

14. The display device as claimed in claim 1, further comprising a transparent sheet that:
is placed on the second opaque mask and the front face of the touch panel, and
is covered with a polarizer that limits parasitic reflections from the transparent sheet.

15. The display device as claimed in claim 1, further comprising a transparent sheet that:
is placed between a polarizer layer and the second opaque mask.

16. The display device as claimed in claim 1, wherein the touch panel is positioned directly between the first opaque mask and the second opaque mask.

17. The display device as claimed in claim 1, wherein the display screen is only masked by the first opaque mask and the lateral portion of the lateral frame.

18. A display device especially intended for an automotive vehicle, comprising:
a display screen having a front surface comprising a display area and a lateral portion;
a touch panel placed in front of the display screen;
a lateral frame placed between the display screen and the touch panel to cover an entire peripheral edge of the display screen, the lateral frame having an L shape with a lateral portion and a side portion, the side portion extending along sides of the display screen and the lateral portion extending over the entire lateral portion of the display screen and over a portion of the display area of the display screen; and
a first opaque mask placed in front of the lateral frame between the touch panel and the lateral frame, the first opaque mask covering the entire lateral portion of the lateral frame and extending beyond the lateral portion of the lateral frame and over the display area of the display screen so as to mask said lateral frame,
a second opaque mask placed in front of the touch panel, the second opaque mask extending at least from an edge of the touch panel and masking a lateral portion of a front surface of the touch panel, the second opaque mask placed in front of the first opaque mask,
wherein the first opaque mask is deposited by screen printing on a back surface of the touch panel and the first opaque mask extends in a direction of a center of the front surface of the display screen beyond the second opaque mask such that a predetermined angle between 0° and 55° is formed between a straight line connecting a point of the first opaque mask closest to a center of the front surface of the display screen and a point of the second opaque mask closest to the center of the front surface of the display screen, and a line normal to the front surface of the display screen at the point of the first opaque mask closest to the center of the front surface of the display screen.

19. The display device as claimed in claim 18, wherein the first and second opaque masks extend substantially in the same way in the direction of the center of the front surface of the display screen beyond the lateral frame.

* * * * *